(12) United States Patent
Hamama et al.

(10) Patent No.: US 9,157,825 B2
(45) Date of Patent: Oct. 13, 2015

(54) ENGINE KNOCK DIAGNOSTIC

(75) Inventors: Wajdi B. Hamama, Whitmore Lake, MI (US); Craig M. Sawdon, Williamston, MI (US); Eric Ferch, Northville, MI (US); Hamid M. Esfahan, Ann Arbor, MI (US); John F. Van Gilder, Webberville, MI (US); Brian D. Francis, Fenton, MI (US); Anthony E. Cubr, Fenton, MI (US)

(73) Assignee: GM Global Technology Operations LLC, Detriot, MI (US)

( * ) Notice: Subject to any disclaimer, the term of this patent is extended or adjusted under 35 U.S.C. 154(b) by 323 days.

(21) Appl. No.: 12/269,346

(22) Filed: Nov. 12, 2008

(65) Prior Publication Data
US 2009/0276147 A1    Nov. 5, 2009

Related U.S. Application Data

(60) Provisional application No. 61/049,648, filed on May 1, 2008.

(51) Int. Cl.
G06F 7/00 (2006.01)
G06F 17/00 (2006.01)
G01L 23/22 (2006.01)
F02D 41/00 (2006.01)
F02P 5/152 (2006.01)
F02D 35/02 (2006.01)

(52) U.S. Cl.
CPC ............ *G01L 23/225* (2013.01); *F02D 41/008* (2013.01); *F02P 5/1522* (2013.01); *G01L 23/227* (2013.01); *F02D 35/027* (2013.01)

(58) Field of Classification Search
CPC .... F02D 35/027; F02D 41/008; F02P 5/1522; G01L 23/227
USPC ......... 701/111; 73/35.09; 123/406.37, 406.39
See application file for complete search history.

(56) References Cited

U.S. PATENT DOCUMENTS 4,269,154 A * 5/1981 Iwata et al. .............. 123/406.35
4,331,117 A   5/1982 Ginsburgh
4,354,378 A   10/1982 Oshiage et al.
4,356,551 A   10/1982 Iwase et al.
(Continued)

FOREIGN PATENT DOCUMENTS

CN      2856961 Y    1/2007
CN    101019013 A    8/2007
(Continued)

OTHER PUBLICATIONS

U.S. Appl. No. 13/832,154, filed Mar. 15, 2013, Hamama et al.

*Primary Examiner* — Mahmoud Gimie
*Assistant Examiner* — David Hamaoui

(57) ABSTRACT

A knock diagnostic module having a knock module that increments a sample count when a cylinder firing signal corresponding to a first cylinder is received and selectively increments a knock count based on a knock detection signal that corresponds to the cylinder firing signal of the first cylinder A knock analysis module analyzes the knock count of the first cylinder when the sample count of the first cylinder reaches a predetermined value and selectively generates an excessive knock signal when the knock count exceeds a predetermined threshold. A remedial action module selectively performs a remedial action based on the excessive knock signal.

18 Claims, 8 Drawing Sheets

(56) References Cited

U.S. PATENT DOCUMENTS

| | | | |
|---|---|---|---|
| 4,376,429 A * | 3/1983 | Youngblood | 123/406.21 |
| 4,462,362 A * | 7/1984 | Bonitz et al. | 123/406.16 |
| 4,483,180 A | 11/1984 | Ohbuchi et al. | |
| 4,760,828 A | 8/1988 | Shimada et al. | |
| 4,770,143 A * | 9/1988 | Takahashi | 123/406.16 |
| 4,802,455 A | 2/1989 | Abo | |
| 4,821,194 A * | 4/1989 | Kawamura | 701/111 |
| 4,903,210 A * | 2/1990 | Akasu | 701/111 |
| 4,961,319 A | 10/1990 | Lyon | |
| 4,969,440 A | 11/1990 | Murakami et al. | |
| 5,287,837 A | 2/1994 | Hashimoto et al. | |
| 5,524,206 A * | 6/1996 | Saito | 714/23 |
| 5,743,233 A | 4/1998 | Unland et al. | |
| 6,230,546 B1 * | 5/2001 | Wilstermann et al. | 73/35.08 |
| 6,234,146 B1 | 5/2001 | Tanaya et al. | |
| 6,763,297 B1 | 7/2004 | Stahl et al. | |
| 6,947,828 B2 | 9/2005 | Fujiwara et al. | |
| 6,981,487 B2 | 1/2006 | Ohtani | |
| 7,043,353 B2 * | 5/2006 | Takemura et al. | 701/111 |
| 7,104,260 B2 | 9/2006 | Nakazawa et al. | |
| 7,246,600 B2 * | 7/2007 | Nakashima et al. | 123/435 |
| 7,526,943 B2 * | 5/2009 | Cubr et al. | 73/35.09 |
| 7,769,536 B2 * | 8/2010 | Hamama et al. | 701/111 |
| 8,478,511 B2 * | 7/2013 | Hamama et al. | 701/111 |
| 8,538,666 B2 * | 9/2013 | Buslepp et al. | 701/111 |
| 2004/0030486 A1 | 2/2004 | Sauler et al. | |
| 2005/0098156 A1 | 5/2005 | Ohtani | |
| 2006/0021422 A1 | 2/2006 | Demura et al. | |
| 2006/0122765 A1 | 6/2006 | Nakao et al. | |
| 2006/0124107 A1 | 6/2006 | Sauler et al. | |
| 2006/0207555 A1 | 9/2006 | Ito et al. | |
| 2007/0028893 A1 * | 2/2007 | Hernandez | 123/406.16 |
| 2007/0215111 A1 | 9/2007 | Surnilla | |
| 2007/0277780 A1 | 12/2007 | Akazaki et al. | |
| 2008/0276689 A1 * | 11/2008 | Tanaya et al. | 73/35.09 |
| 2008/0312810 A1 | 12/2008 | Nonoyama | |
| 2009/0043484 A1 | 2/2009 | Yoshihara et al. | |
| 2009/0211337 A1 | 8/2009 | Masuda et al. | |
| 2010/0138135 A1 | 6/2010 | Hacker et al. | |
| 2011/0118960 A1 | 5/2011 | Komatsu et al. | |
| 2011/0178750 A1 | 7/2011 | Kitamura et al. | |
| 2011/0265454 A1 | 11/2011 | Smith et al. | |
| 2011/0276293 A1 | 11/2011 | Kitamura et al. | |
| 2012/0048234 A1 | 3/2012 | Hamama et al. | |
| 2012/0080008 A1 | 4/2012 | Matsushima et al. | |
| 2012/0285161 A1 | 11/2012 | Kerns et al. | |
| 2014/0278010 A1 * | 9/2014 | Hamama et al. | 701/106 |

FOREIGN PATENT DOCUMENTS

| | | |
|---|---|---|
| DE | 102007051784 A1 | 11/2008 |
| DE | 102009001188 A1 | 9/2009 |
| EP | 1531324 B1 | 12/2011 |
| JP | 2004270626 A | 9/2004 |
| WO | WO-2007001040 A1 | 1/2007 |

\* cited by examiner

| Sample Count | Knock Count | Abnormal Range Count | Previous Raw Data | Variation Sum |
|---|---|---|---|---|
| Sensor 1 | | | | |
| Sensor 2 | | | | |
| Cylinder 1 | | | | |
| Cylinder 2 | | | | |
| Cylinder 3 | | | | |
| Cylinder 4 | | | | |
| Cylinder 5 | | | | |
| Cylinder 6 | | | | |

ENGINE KNOCK DIAGNOSTIC

CROSS-REFERENCE TO RELATED APPLICATIONS

This application claims the benefit of U.S. Provisional Application No. 61/049,648 filed on May 1, 2008. The entire disclosure of the above application is incorporated herein by reference.

FIELD

The present disclosure relates to engine knock detection systems, and more particularly to diagnostic systems and methods for engine knock.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a knock control system 100 according to the prior art is presented. The knock control system 100 includes an engine 102, which includes multiple cylinders 104. The engine 102 includes a vibration sensor 106 that measures vibration of the engine 102. Vibration may be caused by early detonation within the cylinders 104, also referred to as knock. In various implementations, the vibration sensor 106 may include a piezoelectric accelerometer.

An output of the vibration sensor 106 is received by an analog to digital (A/D) converter 110. The A/D converter 110 digitizes the output of the vibration sensor 106 and communicates the digitized output to a digital signal processor (DSP) 114. The DSP 114 performs a Fast Fourier Transform (FFT) on the digitized output. The frequency content of the digitized output is transmitted to a knock detection module 116.

The knock detection module 116 determines whether knock is occurring based upon the frequency content of the output of the vibration sensor 106. The knock detection module 116 may select a peak intensity or an average intensity across the frequencies of the FFT calculated by the DSP 114. The knock detection module 116 may compare the average or peak intensity to a threshold intensity and determine that knock is present when the threshold intensity is exceeded.

The knock detection module 116 may adapt the threshold intensity to background vibration unrelated to knock that is present in the engine 102. The knock detection module 116 transmits knock information to a knock control module 118. Based on the knock information, the knock control module 118 varies operating parameters of the engine 102 to reduce knock. For example, the knock control module 118 may instruct the engine 102 to retard spark.

SUMMARY

In one embodiment, a knock diagnostic system is provided that includes a knock module that increments a sample count when a cylinder firing signal corresponding to a first cylinder is received and selectively increments a knock count based on a knock detection signal that corresponds to the cylinder firing signal of the first cylinder. A knock analysis module analyzes the knock count of the first cylinder when the sample count of the first cylinder reaches a predetermined value and selectively generates an excessive knock signal when the knock count exceeds a predetermined threshold. A remedial action module that selectively performs a remedial action based on the excessive knock signal.

In other features, a method of knock detection includes incrementing a sample count when a cylinder firing signal corresponding to a first cylinder is received and selectively incrementing a knock count based on a knock detection signal that corresponds to the cylinder firing signal of the first cylinder. The knock count is analyzed for the first cylinder when the sample count of the first cylinder reaches a predetermined value and selectively generating an excessive knock signal when the knock count exceeds a predetermined threshold. Selectively performing a remedial action based on the excessive knock signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
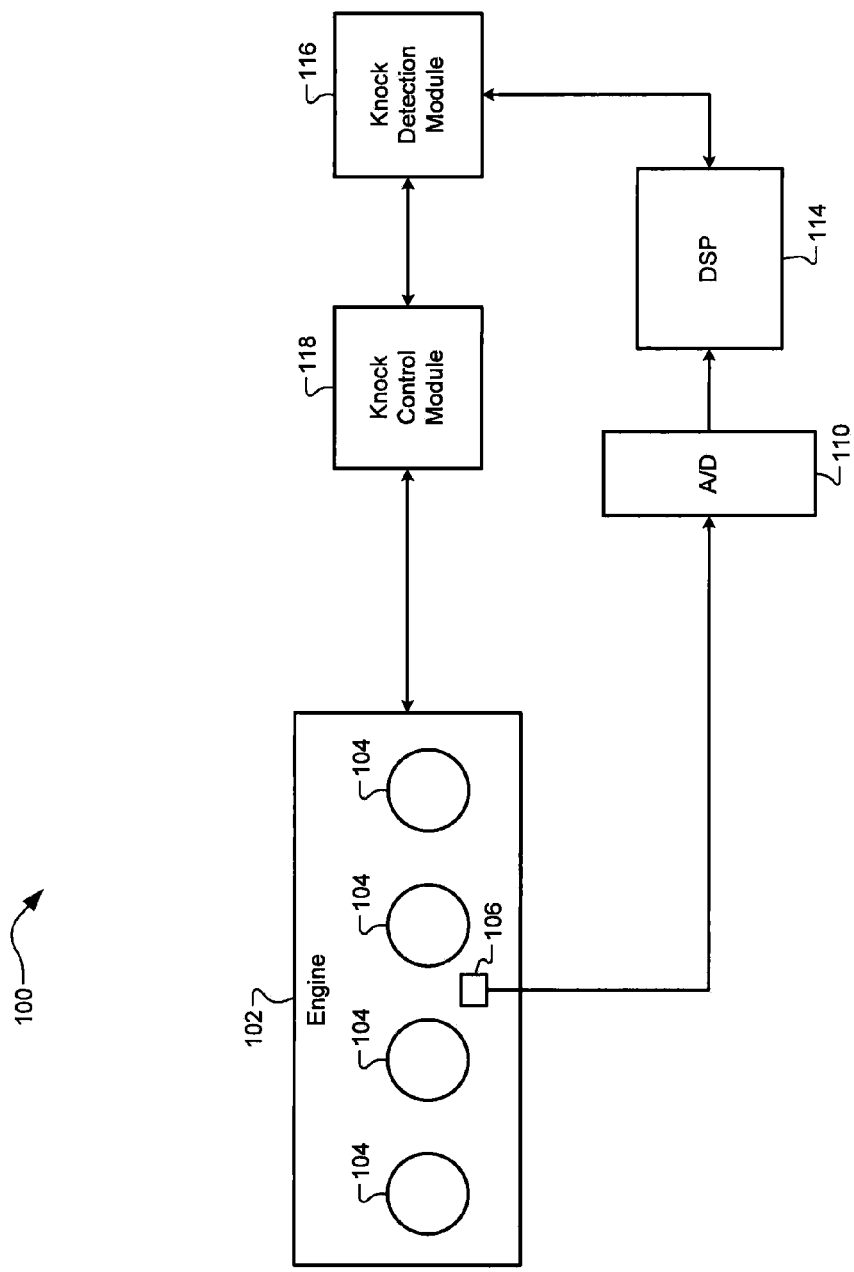
FIG. 1 is a functional block diagram of a knock control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Knock detection depends on sensors measuring knock conditions in the cylinder block. For example, vibration sensors may be used to detect knock. In various implementations, one knock sensor may be used for each bank of cylinders in an engine. For example, for an eight-cylinder engine in a V-8 configuration, there is one knock sensor for each bank of four cylinders. If one of the vibration sensors is malfunctioning and/or not installed correctly, knock data corresponding to that bank of cylinders may be flawed.

Similarly, if other sources of vibration are present in one or more of the cylinders, this may falsely be detected as knock by the vibration sensors. For example, a malfunctioning valve lifter may generate vibration corresponding to the firing window of one of the cylinders, and therefore be detected as knock for that cylinder.

Figure 2:
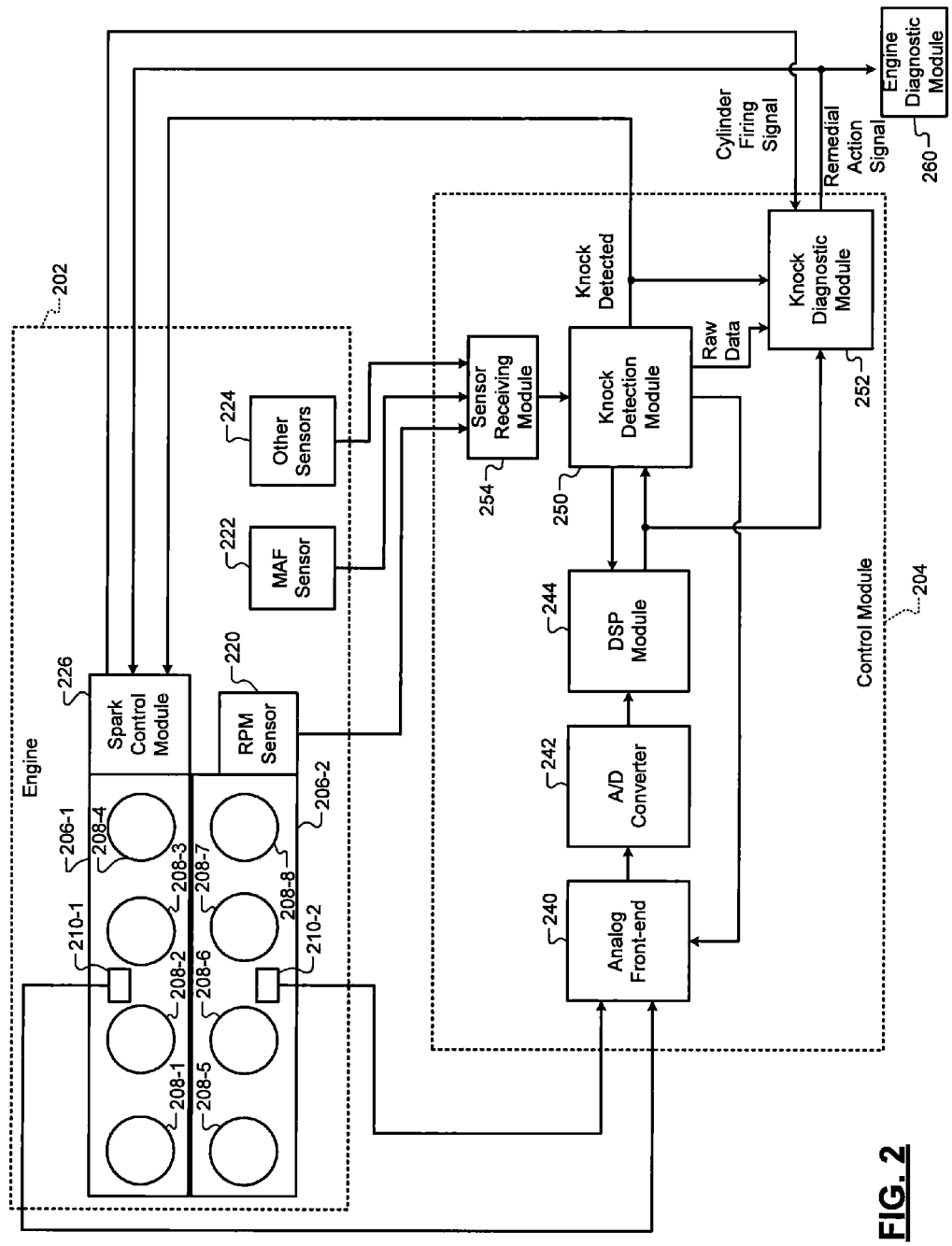
FIG. 2 is a functional block diagram of an exemplary knock control system according to the principles of the present disclosure.
Figure 3:
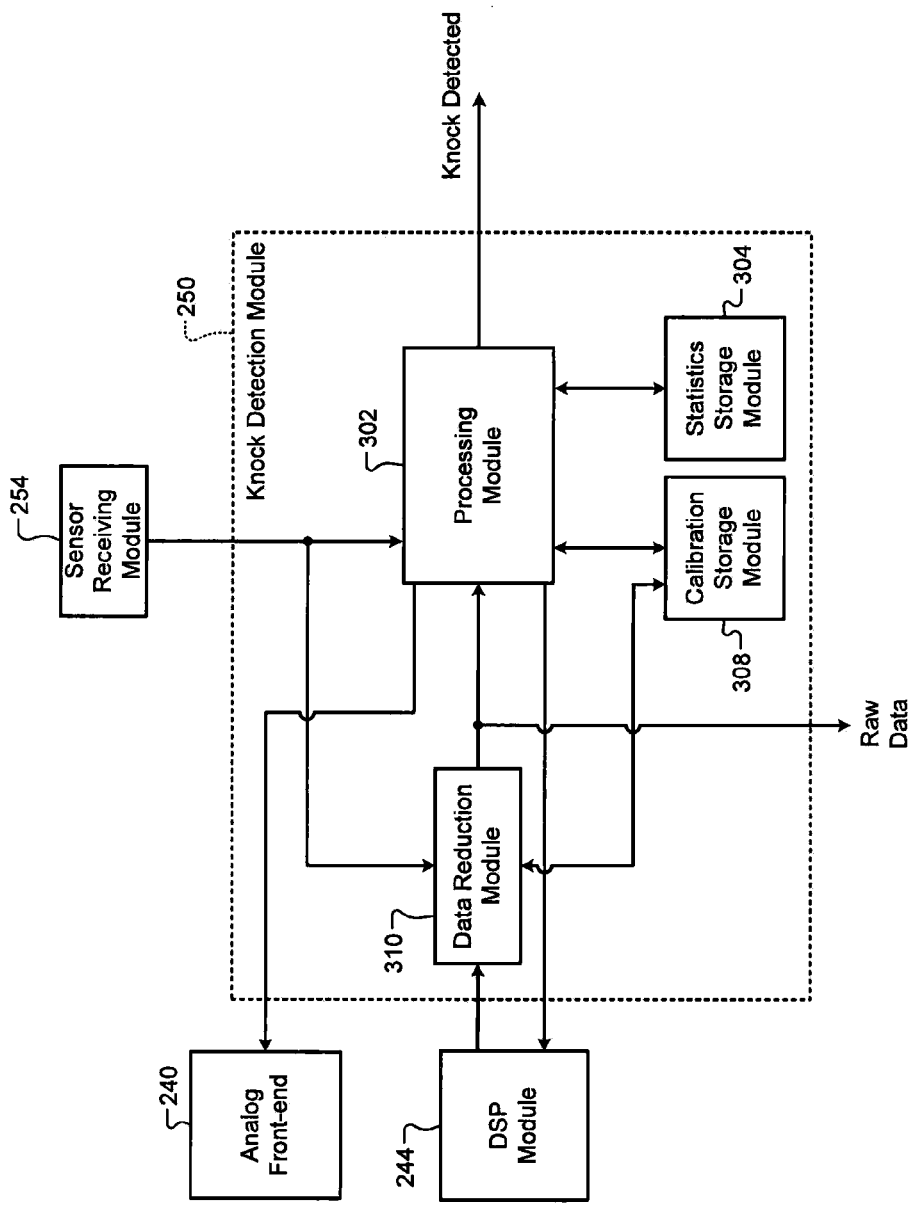
FIG. 3 is a functional block diagram of an exemplary knock detection module of the knock control system according to the principles of the present disclosure.
Figure 4:
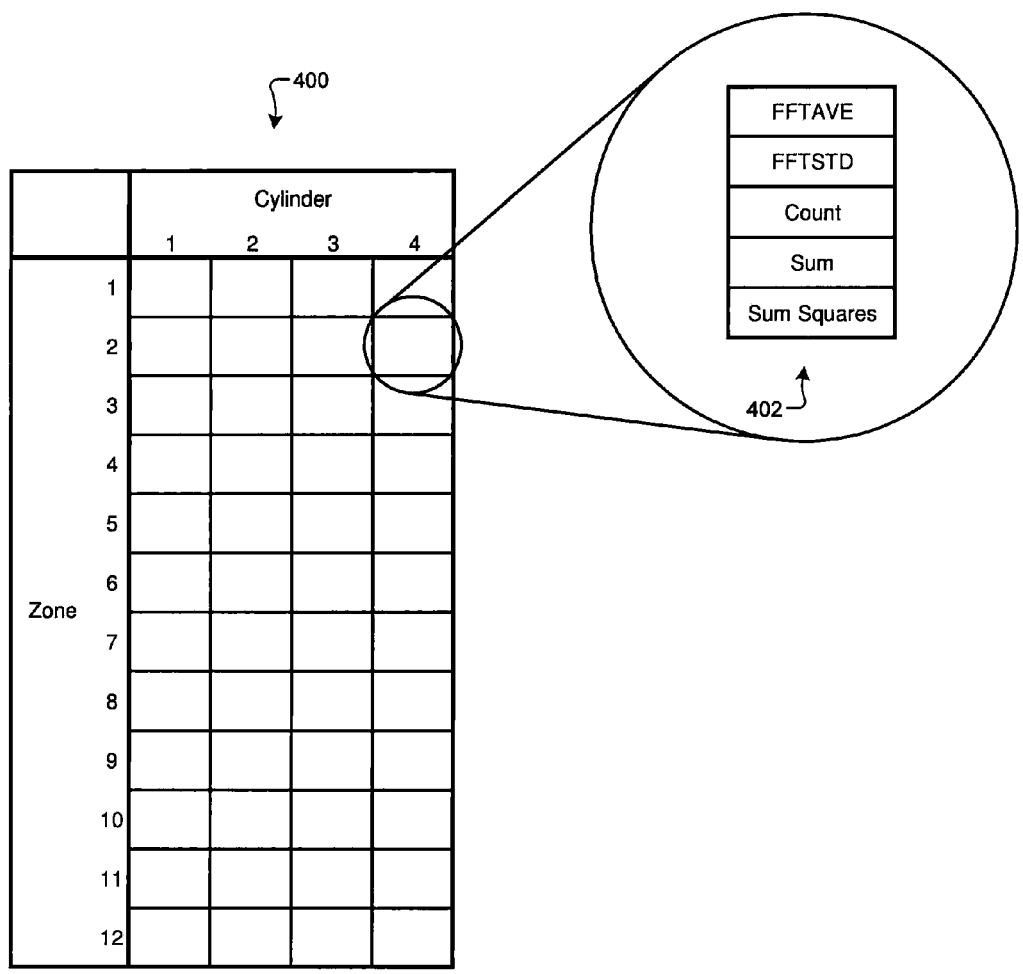
FIG. 4 is a graphical representation of exemplary contents of the statistics storage module according to the principles of the present disclosure.
Figure 5:
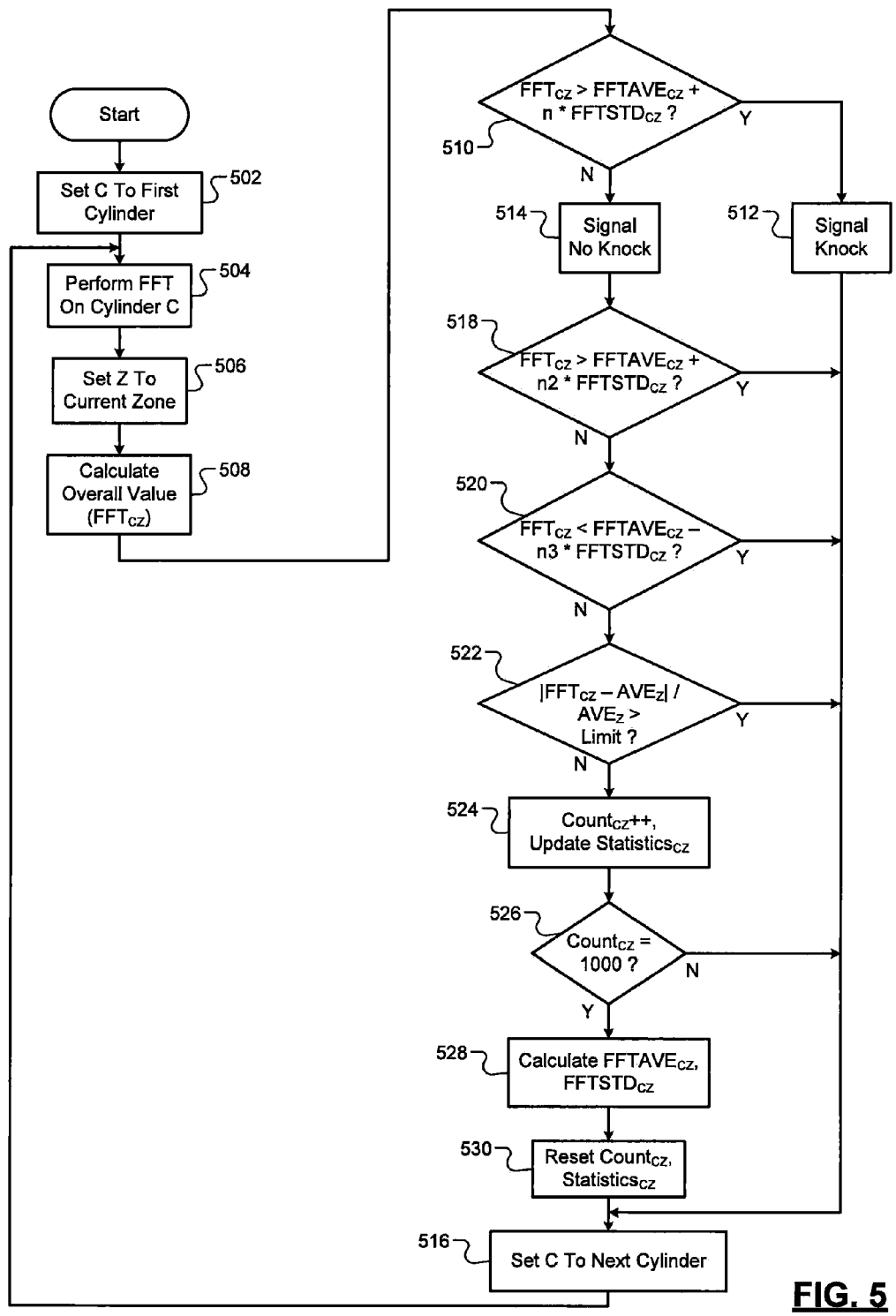
FIG. 5 is a flowchart depicting exemplary steps performed by the knock detection module according to the principles of the present disclosure.
Figures 6, 7:
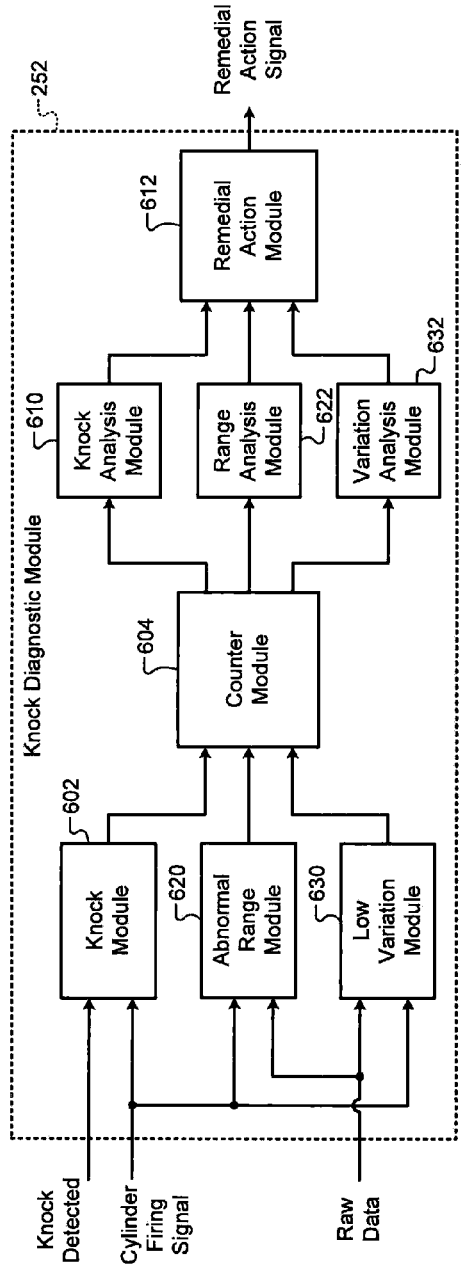
FIG. 6 is a functional block diagram of an exemplary knock diagnostic module of the knock control system according to the principles of the present disclosure.
FIG. 7 depicts an exemplary table that can be used to track whether excessive knock is being detected according to the principles of the present disclosure.
Figure 8A:
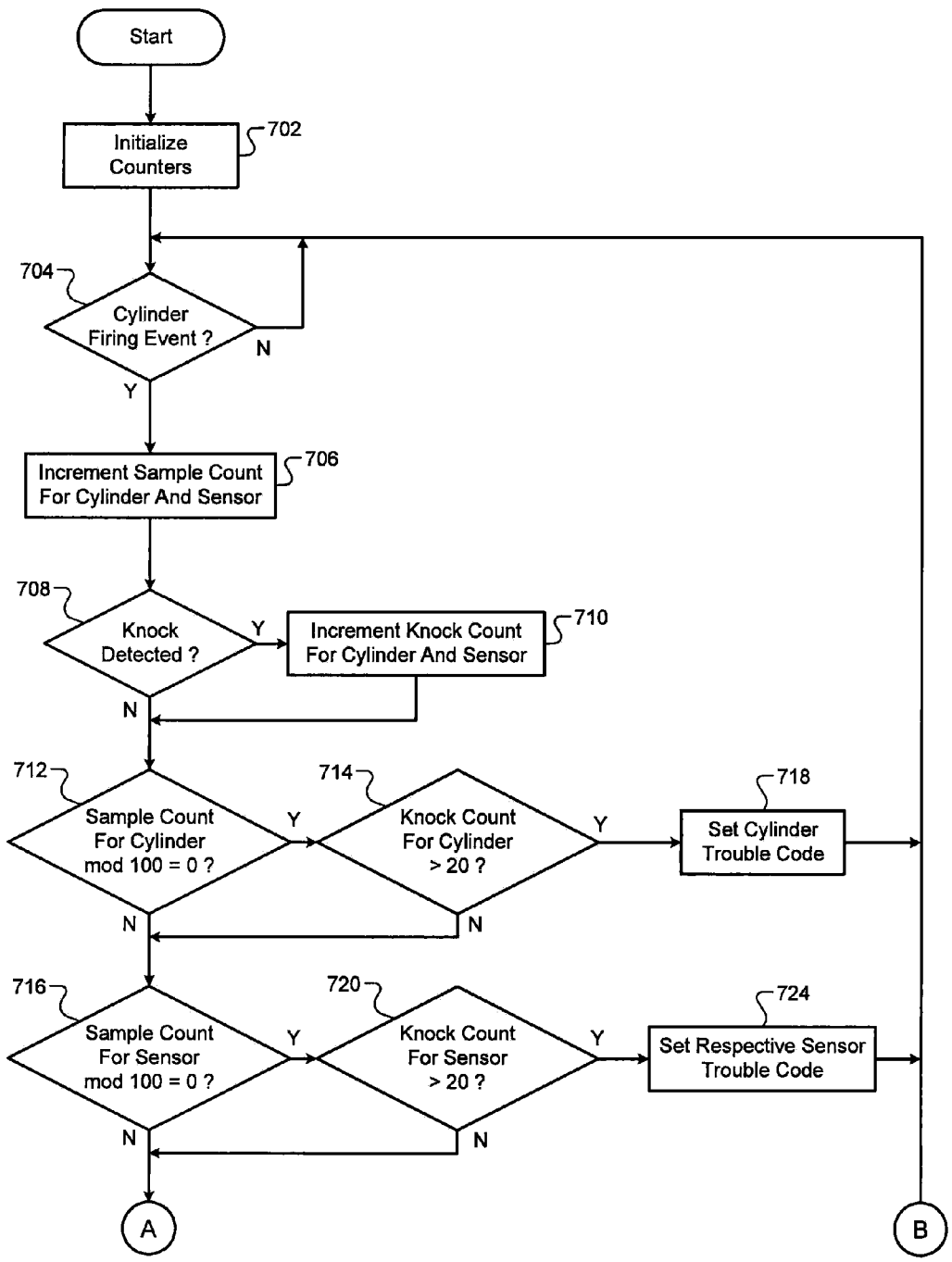
FIGS. 8A-8B are flowcharts depicting exemplary steps performed by the knock diagnostic module according to the principles of the present disclosure.
Figure 8B:
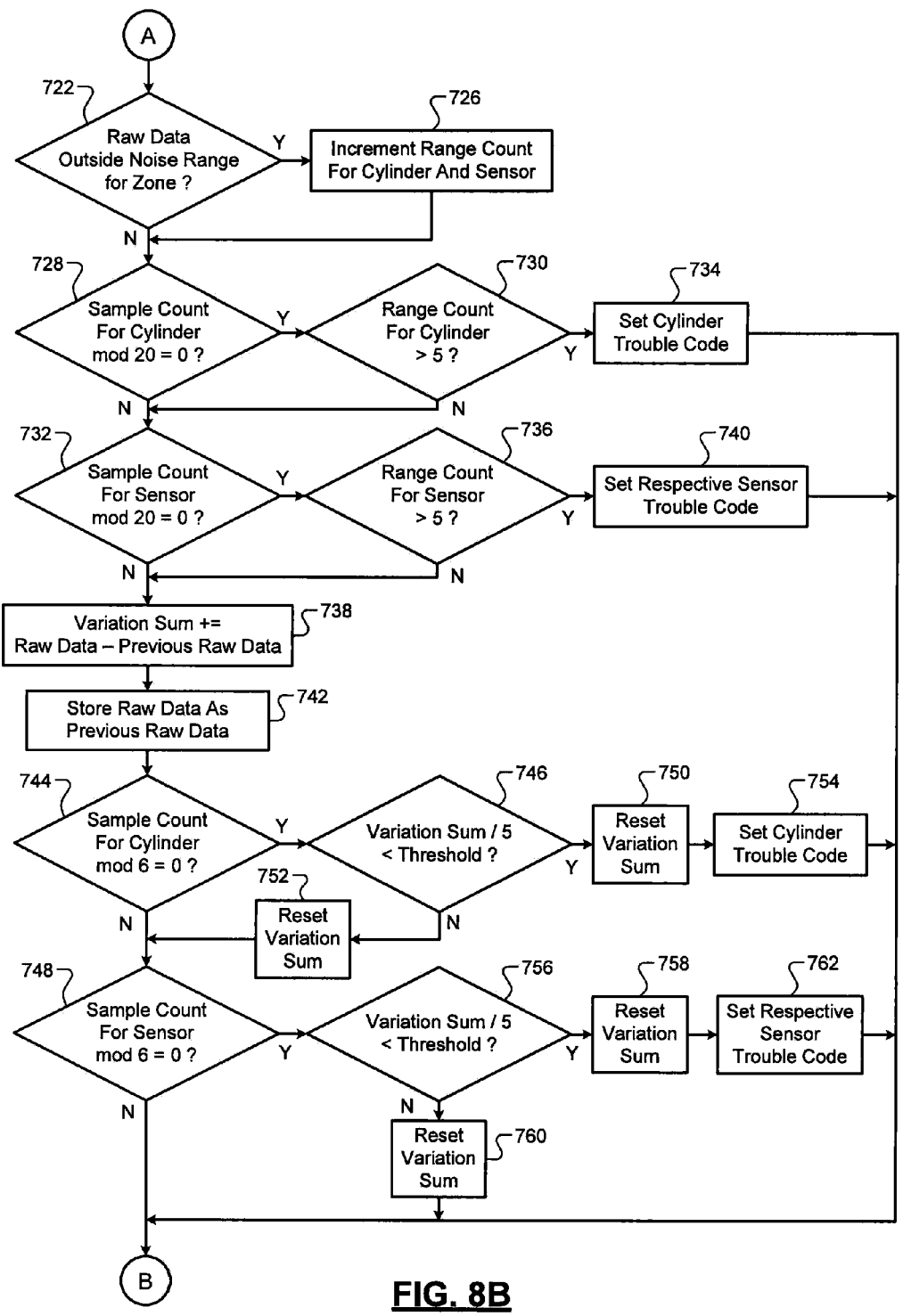

In brief, FIG. 2 shows a functional block diagram of an exemplary knock control system. FIG. 3 is a block diagram of a knock detection module of the knock control system. FIG. 4 depicts an exemplary scheme for adapting to background noise when detecting knock. FIG. 5 depicts exemplary operation of the knock detection module. FIG. 6 is a block diagram of an exemplary knock diagnostic module. FIG. 7 is an exemplary diagnostic table that can be used to track whether excessive knock is being detected. FIGS. 8A-8B are flowcharts depicting exemplary steps performed by the knock diagnostic module.

The knock diagnostic module analyzes the knock detection system to detect irregularities. Three examples are described here: excessive knock detection, abnormal range values, and insufficient variation. The knock diagnostic module detects knock to determine if excessive knock is being detected.

Even in badly knocking engines, the total amount of knock will rarely exceed a threshold, such as 20 percent. The percentage may be determined by dividing the number of detected knock events by the total number of cylinder firing events. Excessive knock may be determined separately for each sensor and for each cylinder. In this way, faults related to the sensor should show up clearly when segregating data for that sensor, while faults relating to a cylinder should show up clearly when segregating data for that cylinder.

Knock data may be analyzed to see if there is insufficient variation between readings. This may cause no knock to be detected. However, when there is insufficient variation in readings, it is more likely that a system fault is preventing accurate measurements from being made than that no knock is present. Actual knock events may therefore remain undetected. The system fault may be caused by a faulty knock sensor or an improperly installed knock sensor, for example only.

Sufficient variation may be detected by analyzing raw data. For example, a Fast Fourier transform (FFT) may be performed on the vibration sensor output. This FFT may be reduced to a single intensity value. This intensity value may be analyzed over time to determine if there is sufficient variation. For example, the variation from reading to reading may be compared to a threshold. Alternatively, an average or a moving average of sample-to-sample variation may be determined. In addition, standard deviation of intensity values may be calculated. If the standard deviation is below a threshold, the intensity data may not accurately reflect engine conditions.

Another fault that may be diagnosed is when sensor data is too often outside of expected ranges. In various implementations, multiple load zones may be defined. Load zones may be defined by air flow, such as mass air flow (MAF) or air per cylinder (APC), and engine revolutions per minute (RPM). For example, when four APC regions are defined and 17 RPM regions are defined, there would be 68 total load zones.

During calibration, a lower and upper limit can be established for each of the load zones. During operation, the current zone can be determined based upon the current APC and RPM. If the measured intensity is outside of the defined range for that zone, a counter may be incremented, indicating that the intensity is outside of the normal range. If intensity values are outside of a normal range often enough, a knock system fault may be signaled.

Based on the determination of excessive knock, insufficient variation, and abnormal range, a remedial action may be performed, such as setting a DTC (Diagnostic Trouble Code). The DTC may be used by a spark control module of the engine. For example, when the DTC is set, a spark control module may no longer be able to control spark timing based on knock detection. The spark control module may therefore avoid aggressive spark advance, because resulting knock may not be accurately detected. DTCs may be defined for each sensor and for each cylinder. Alternatively, a first DTC may be used for faults of any sensor, and a second DTC may be used for faults of any cylinder. Alternatively, a DTC may be defined for each bank of cylinders.

Referring back to FIG. 2, a functional block diagram of an exemplary knock control system is shown. The system includes an engine 202 and a control module 204. The engine 202 includes one or more cylinder banks 206. For example only, two cylinder banks, 206-1 and 206-2 are shown. Each of the cylinder banks 206-1 and 206-2 includes one or more cylinders 208. For example only, eight cylinders 208 are shown. This may correspond to a V-8 configuration. Each of the cylinder banks 206-1 and 206-2 includes at least one vibration sensor 210.

The engine 202 includes a revolutions per minute (RPM) sensor 220. The RPM sensor 220 may be connected to a crankshaft (not shown) of the engine 202 to measure engine speed. The engine 202 may also include a mass air flow (MAF) sensor 222 and the other sensors 224. A spark control module 226 controls timing of ignition spark for each of the cylinders 208.

The control module 204 receives signals from the vibration sensors 210 and provides data to the spark control module 226. The control module 204 may be implemented as part of an engine control module. The engine control module may also include the spark control module 226. The control module 204 includes an analog front-end 240.

The analog front-end 240 may select between the signals from the vibration sensors 210 based upon which of the cylinders 208 is being analyzed. Each of the cylinders 208 fires in a predetermined sequence. Firing means that the spark plug ignites the air/fuel mixture in the cylinder 208. During this combustion phase, knock may occur for this cylinder 208.

The window surrounding the cylinder firing for a given cylinder 208 is referred to as that cylinder's knock window. The vibration profile of a cylinder is measured during the cylinder's knock window. The analog front-end 240 may select the inputs from the vibration sensor 210 that is located in the cylinder bank 206 having the cylinder 208 that is currently operating in the cylinder knock window.

If multiple vibration sensors 210 are present in the cylinder banks 206, the analog front-end 240 may select the closest vibration sensor 210 to the cylinder 208 being measured. The analog front-end 240 may include a differential input circuit. The differential input circuit may convert a differential input from one of the vibration sensors 210 into a single-ended output.

The analog front-end 240 may include an analog filter that filters the output of the vibration sensors 210. For example, the analog filter may include a first-order filter with a low-pass cut-off frequency of 25 kHz. The analog front-end 240 may also include a gain/attentuation module, such as a gain control module (not shown). Alternatively, the gain/attentuation module may amplify or attenuate its input by a predetermined amount.

An output of the analog front-end 240 is transmitted to an analog-to-digital (A/D) converter 242. The A/D converter 242 outputs a digitized version of its input to a digital signal processor (DSP) module 244. The A/D converter 242 may have, for example, 10-bit or greater resolution. The DSP module 244 may apply a digital filter to the received signal. For example, the DSP module 244 may implement a fourth-order elliptic infinite impulse response (IIR) digital filter with a cut-off frequency of 20 kHz. Alternatively, the DSP module 244 may implement two second-order IIR filters in series to improve stability.

The DSP module 244 may perform digital decimation and may remove DC bias. For each of the cylinders 208, the DSP module 244 performs at least one Fast Fourier Transform (FFT) during a cylinder's knock window. The knock windows for each of the cylinders 208 may be defined in terms of crankshaft rotational degrees of the crankshaft. The knock windows may be fixed or may be varied based upon engine RPM or other engine operating parameters.

If the time elapsed during a knock window is long enough, such as at low RPM, the DSP module 244 may collect enough data to compute multiple FFTs during the knock window. If data for the last FFT is only partially gathered when the knock window ends, the data may be zero padded. Alternatively, data from previous FFTs may be used to complete a data set for the last FFT.

If knock windows for different cylinders 208 are allowed to overlap, the control module 204 may include an additional analog front-end, an additional A/D converter, and an additional DSP module. In this way, the overlapping portions of the knock window can be captured and analyzed in parallel. If the DSP module 244 has faster than real-time processing capacity, the DSP module 244 may be able to process data from overlapping knock windows without an additional DSP module. A buffer may then be included between the A/D converter 242 and the DSP module 244.

The starting and ending points of knock windows may be transmitted to the DSP module 244 by a knock detection module 250. The knock detection module 250 receives FFT data from the DSP module 244 and generates a knock detection signal indicating whether or not knock has been detected. This signal is transmitted to the spark control module 226 and to a knock diagnostic module 252.

A sensor receiving module 254 receives sensor data, such as from the RPM sensor 220, the MAF sensor 222 and other sensors 224. The sensor receiving module 254 may condition incoming signals using techniques similar to those performed by the analog front-end 240, and may convert condition signals into the digital domain. The RPM sensor 220 may transmit signals based upon crankshaft angle so that the knock detection module 250 can determine when knock windows are occurring. The knock detection module 250 may instruct the analog front-end 240 on which vibration sensor to select.

In order to more accurately detect knock, the knock detection module 250 may determine in which zone the engine 202 is currently operating. The zone may be determined based upon engine speed, which may be indicated by the RPM sensor 220, and by engine load, which may be indicated by the MAF sensor 222. For example only, four ranges of engine load and 17 ranges of engine speed may be defined, producing 68 zones.

The knock diagnostic module 252 may receive data from the DSP module 244 and/or from the knock detection module 250. The knock diagnostic module 252 analyzes possible faults in the knock detection system and generates a trouble code if a fault is detected. This trouble code is received by the spark control module 226 and an engine diagnostic module 260. The engine diagnostic module 260 may store the trouble code and may indicate the problem to the user, such as with the check engine light.

When a trouble code is received by the spark control module 226, the spark control module 226 may avoid aggressive spark advance. Aggressive spark advance may cause knock, and the spark control module 226 can no longer rely on the knock detection module to detect this condition. Normally, when knock is detected, the spark control module 226 retards the spark timing.

Referring now to FIG. 3, a functional block diagram of an exemplary implementation of the knock detection module 250 is depicted. The knock detection module 250 includes a processing module 302 and a statistics storage module 304. The knock detection module 250 may also include a calibration storage module 308. The processing module 302 may receive FFT data directly from the DSP module 244.

Alternatively, a data reduction module 310 may reduce the FFT from the DSP module 244 into one or more intensity values. For example, the data reduction module 310 may reduce FFT data to a single intensity value. The data reduction module 310 may perform its reduction based on signals from the sensor receiving module 254 and criteria from the calibration storage module 308.

For each cylinder's knock window, the data reduction module 310 may receive one or more FFTs from the DSP module 244. As described above, the number of FFTs generated by the DSP module 244 depends upon the time elapsed during the knock window. For example only, each FFT may be 128 points. Portions of each FFT may be truncated, such as by removing the last 64 points of each FFT.

One or more ranges of points of interest may be defined for each of the FFTs. For example, three ranges of interest will be defined for each of the received FFTs. The ranges may be defined based upon RPM. Because FFTs are in the frequency domain, a range of points of interest translates to a frequency range of interest.

Within each range of FFT points, a single value may be determined. For example, the maximum intensity FFT point within the range may be selected or an average of FFT points within the range may be calculated. For each FFT, one of the ranges may be selected. For example, the range selection may be based upon RPM. Because each range has been reduced to a single value, selecting a range can reduce the entire FFT to a single value. A selection of the range may be based upon RPM or the largest value can be chosen.

Next, one of the FFTs may be chosen. The single value corresponding to the chosen FFT can be used as the single intensity value. The FFT may be selected based upon RPM. Alternatively, the maximum FFT value may be chosen or an average of the FFT values may be calculated. Because each of the FFTs corresponds to a different time portion of the knock window, a calibrator may determine that at certain RPMs, one of the FFTs is a more reliable indicator of engine knock.

The calibration storage module 308 may include calibration decisions such as whether to use maximum or average determinations and tables of FFT ranges indexed by RPM. The processing module 302 determines the current engine operating zone, and compares the single intensity value to the historical intensity data for that zone.

The historical data may further be classified by cylinder. For example, historical data may be stored for each cylinder in each zone. If enough historical data is not available for a certain cylinder in a certain zone, data from neighboring zones may be interpolated to estimate what the current intensity should be. Alternatively, initial values may be used as historical data. These initial values may be provided by calibrators.

As the processing module 302 receives intensity values for various cylinders in various zones, statistics are updated in the statistics storage module 304. The statistics storage module 304 may be manually reset by a service technician or may be automatically reset by an internal diagnostic routine. For example, a diagnostic routine may determine that data within the statistics storage module 304 is invalid. The statistics storage module 304 can then be cleared and/or reset to calibrated values.

The processing module 302 may determine that knock has occurred if the received intensity value is more than a predetermined number of standard deviations above the average for that cylinder operating in the current zone. The statistics storage module 304 may be updated when received intensity values are within a predetermined range of the historical average value. The processing module 302 may output whether knock has been detected, and may indicate the intensity of the knock if present.

Referring now to FIG. 4, a graphical representation of exemplary contents of the statistics storage module 304 is presented. A two-dimensional table 400 may include a grid of data structures indexed by cylinder and zone. For example only, the table 400 is shown with four cylinders and 12 zones. For example only, the 12 zones may correspond to four RPM ranges and three load ranges. Instead of having a collective zone based on RPM and load, the table 400 could be implemented as a three-dimensional table indexed by cylinder, RPM, and engine load.

A representative data structure of the table 400 is shown at 402. The data structure 402 includes average and standard deviation values to which new intensity values are compared. In addition, the data structure 402 includes statistical information used for updating the average and standard deviation values. For example, the data structure 402 may include a count, a running sum, and a running sum of squares. When a new intensity value is received for the data structure 402, the count element is incremented. In addition, the sum element may be increased by the intensity value, while the sum of squares element is increased by the square of the intensity value.

Once the count element reaches a predetermined value, such as 1,000, a new average and standard deviation can be calculated and stored into the data structure 402. By storing the sum and the sum of squares, a true standard deviation can be calculated. The count, sum, and sum of squares elements may then be reset, such as to zero.

Referring now to FIG. 5, a flowchart depicts exemplary steps performed by the processing module 302 of FIG. 3. Control begins in step 502, where a variable C is set equal to the number of the cylinder whose knock window will first be encountered. Control continues in step 504, where one or more FFTs is performed during the knock window of cylinder C.

Control continues in step 506, where control sets a variable Z to be a number representing the current engine operating zone. For example, there may be M RPM ranges and N engine load ranges, producing M times N zones. In various implementations, M is equal to 17 and N is equal to 4. Control continues in step 508, where an overall intensity value is calculated. The overall intensity value is labeled $FFT_{CZ}$ to indicate that the value corresponds to cylinder C operating in zone Z.

Control continues in step 510, where control compares $FFT_{CZ}$ to stored statistical values. For example, if $FFT_{CZ}$ is greater than the average intensity for the current cylinder and zone ($FFTAVE_{CZ}$) plus a predetermined number (N) of standard deviations ($FFTSTD_{CZ}$), control determines that knock has occurred. If knock has been detected, control transfers to step 512; otherwise, control transfers to step 514.

In step 512, the occurrence of knock and, optionally, the intensity of the knock, are signaled, and control continues in step 516. In step 516, the variable C is set to the cylinder whose knock window will occur next, and control returns to step 504. In step 518, control determines whether $FFT_{CZ}$ is within n2 standard deviations of the average. If so, control transfers to step 516; otherwise, control continues in step 520. An intensity value may be too small to indicate knock and yet too large to be included in the statistical values. Step 518 checks for this condition, meaning that n2 is less than n.

In step 520, control determines if $FFT_{CZ}$ is less than n3 standard deviations below the average. If so, control transfers to step 516; otherwise, control continues in step 522. Step 520 excludes intensity values that are too low from being included into the statistical values. The value n3 may be set equal to n2 to define a symmetric range around the average.

In step 522, a further check is performed. Control determines whether the percentage difference between $FFT_{CZ}$ and an average value specified for that zone is greater than the limit. An average may be specified for each zone by a calibrator. Instead of using a single limit, a positive limit and a negative limit may both be used. If the percentage difference is outside these limits, control will exclude the intensity value from the statistical analysis.

In step 524, $FFT_{CZ}$ has been determined to be acceptable, and is therefore added to the statistics. The count element for this cylinder and zone is incremented, while the statistics, such as sum and sum of squares, are increased. Control continues in step 526, where the count for the current cylinder and zone is compared to a predetermined value, such as 1,000. If so, control transfers to step 528; otherwise, control transfers to step 516. In step 528, a new average and standard deviation are calculated for the current cylinder and zone based on the last 1,000 intensity values. Control continues in step 530, where $Count_{CZ}$ and $Statistics_{CZ}$ are reset, such as to zero. Control then continues in step 516.

Referring now to FIG. 6, an exemplary implementation of the knock diagnostic module 252 is presented. The knock diagnostic module 252 includes a knock module 602. The knock module 602 receives the knock detection signal. When the knock detection signal is received, the knock module 602 updates corresponding counts in a counter module 604.

The counter module 604 may store a count of knock events for each sensor and for each cylinder. An exemplary implementation of the values stored in the counter module 604 is shown in FIG. 7. When the knock detection signal is received, the knock module 602 increments the sample count within the counter module 604. The sample count is incremented for the cylinder whose knock window was analyzed and for the sensor corresponding to that cylinder.

If the knock detection signal indicates that knock was detected, the knock module 602 increments the knock count for that cylinder and for that sensor. Otherwise, the knock module 602 leaves the knock counts unchanged. A knock analysis module 610 analyzes the sample counts. When one of the sample counts reaches a predetermined value, such as 100, the knock analysis module 610 may determine whether the amount of knock detected within that number of samples is excessive.

For example, the knock analysis module 610 may divide the knock count by the sample count. If this value is greater than a threshold, such as 20 percent, the knock analysis module 610 may determine that an excessive knock failure has occurred for that sensor or cylinder. This failure is reported to a remedial action module 612. The remedial action module 612 may generate a trouble code based on the failure information.

For example only, the remedial action module 612 may generate a code indicating that a knock detection problem is present without specifying the exact failure detected. A single code may correspond to a failure in any of the cylinders, and separate codes may be used for each of the sensors.

An abnormal range module 620 receives raw data, such as from the knock detection module 250. The raw data may include the single intensity value from the data reduction module 310. Alternatively, the raw data may be received from the DSP module 244. For example, in a mode referred to as performance diagnostics, the raw data includes the output of the data reduction module 310. In a mode called open diagnostics, the raw data may include data from the DSP module 244, which may be reduced differently than is currently being done by the data reduction module 310.

Based on the raw data, the abnormal range module 620 determines whether the raw data is within a specified range. For example, for a single intensity value, the abnormal range module 620 determines whether that single intensity value is within a specified range. The specified range may include an upper limit and a lower limit and may be retrieved from a table indexed by zone. The raw data may be outside of the specified range when the knock sensor is connected (not open) but is not properly installed in the engine. When this happens, the knock sensor would provide a signal but not within the specified range that corresponds to engine knock.

When the abnormal range module 620 determines that a value is outside of the specified range, the corresponding abnormal range counts in the counter module 604 for both the sensor and the cylinder are incremented. This may occur synchronously with operation of the knock module 602, and therefore the sample count is already incremented by the knock module 602.

A range analysis module 622 evaluates the sample counts, and when one of the sample counts reaches a predetermined value, the range analysis module 622 determines whether the associated abnormal range count is too high. If so, an abnormal range failure has been identified, and this information is provided to the remedial action module 612.

A low variation module 630 determines whether the variation between sample points of raw data is too low. Insufficient variation may indicate that the sensor is not connected or not functioning properly because a certain amount of variation in data is expected for a properly functioning sensor. The low variation module 630 may therefore store previous raw data so it can be compared to the current raw data.

A variation in the raw data can be analyzed in a number of ways. For example, the average of the variations between a number of raw data points can be compared to a threshold. In various implementations, this average may be a moving average or may be an average conducted over non-overlapping intervals.

For example only, and as shown in FIG. 7, a sum of variations may be maintained in the counter module 604. A variation analysis module 632 may review the sample counts and analyze the variation sum when a predetermined sample count, such as six, is reached. The variation sum may then be divided by the number of variations measured to determine average variation. With a sample count of six, five variations between those six values have been measured.

If average variation is below a predetermined threshold, the variation analysis module 632 may transmit a failure signal to the remedial action module 612. The predetermined threshold may be dependent on RPM and engine load. In various implementations, the knock analysis module 610, the range analysis module 622, and the variation analysis module 632 may perform a modulo operation on the sample count. For example, the knock analysis module 610 may compare the sample count modulo 100 to zero. This expression will be equal to zero every 100 samples. The knock analysis module 610 can therefore evaluate each group of 100 cylinder firing events.

Referring now to FIGS. 8A-8B, a flowchart depicts exemplary steps performed by the knock diagnostic module 252. Control begins in step 702, where counter are initialized. Control continues in step 704, where control waits for a cylinder firing event. When a cylinder firing event is over, control continues in step 706; meanwhile, control remains in step 704. In step 706, control increments the sample count for the cylinder having a firing event and for the sensor corresponding to that cylinder.

Control continues in step 708, where control determines whether knock was detected, such as by the knock detection module 250. If so, control transfers to step 710; otherwise, control transfers to step 712. In step 710, the knock counts for the cylinder and the sensor are incremented, and control continues in step 712. In step 712, control determines whether a sample count for the current cylinder modulo 100 is equal to zero. If so, 100 samples have been taken and control transfers to step 714; otherwise, control transfers to step 716. The value of 100 is used for purposes of illustration only.

In step 714, control determines whether the knock count for that cylinder is greater than a predetermined value, such as 20. If so, control transfers to step 718; otherwise, control continues in step 716. A value of 20 in 100 cylinder events corresponds to a knock percentage of 20%, which would be higher than expected, even for a severely knocking engine. In step 718, a cylinder trouble code is set and control returns to step 704.

In step 716, control determines whether the sample count for the sensor modulo 100 is equal to zero. If so, control transfers to step 720; otherwise, control transfers to step 722 of FIG. 8B via indicator A. In step 720, control determines whether the knock count for that sensor is greater than 20. If so, control transfers to step 724; otherwise, control continues in step 722 of FIG. 8B. In step 724, control sets the trouble code for the current sensor. Control then returns to step 704.

Referring now to FIG. 8B, control determines whether the raw data is outside of the specified noise range for the current zone in step 722. If so, control transfers to step 726; otherwise, control transfers to step 728. In step 726, control increments the range counts for the current cylinder and the current sensor. Control then continues in step 728.

In step 728, control determines whether the sample count for the cylinder module 20 is equal to zero. If so, control transfers to step 730; otherwise, control transfers to step 732. In step 730, control determines whether the range count for the cylinder is greater than a predetermined threshold, such as five. If so, control continues in step 734; otherwise, control continues in step 732. In step 734, control sets the cylinder trouble code and control returns to step 704 of FIG. 8A.

In step 732, control determines whether the sample count for the sensor module 20 is equal to zero. If so, control transfers to step 736; otherwise, control transfers to step 738. In step 736, control determines whether the range count for the sensor is greater than five. If so, control transfers to step 740; otherwise, control continues in step 738. In step 740, control sets the sensor trouble code for the current sensor and control returns to step 704.

In step 738, control increments the variation sum by the difference between the raw data and the previous raw data. In various implementations, the variation sum may be a scalar value when the raw data is a single intensity value. Control continues in step 742, where the current raw data is stored as previous raw data for the next iteration. Control continues in step 744.

In step 744, control determines whether the sample count for the cylinder modulo six is zero. If so, control transfers to step 746; otherwise, control transfers to step 748. In step 746, control determines whether the variation sum divided by five is less than a threshold. If so, control transfers to step 750; otherwise, control transfers to step 752. In step 750, the variation sum is reset, and control continues in step 754.

In step 754, the cylinder trouble code is set, and control returns to step 704. In step 752, the variation sum is reset and control continues in step 748. In step 748, the sample count for the sensor modulo six is compared to zero. If equal to zero, control transfers to step 756; otherwise, control returns to step 704. In step 756, control determines whether the variations sum divided by five is less than a threshold. If so, control transfers to step 758; otherwise control transfers to 762. After six samples, only five variations between the six samples have been determined, and therefore five is used as the divisor.

In step 758, the variation sum is reset for this sensor and control continues in step 762. In step 760, the trouble code for this sensor is set and control returns to step 704. In step 760, control resets the variation sum for this sensor and control returns to step 704. The numbers used in FIGS. 8A-8B are shown for example only and may be higher or lower and may be based upon pending operating conditions, such as engine load and RPM.

Although not shown as a step, the sensor trouble codes and the cylinder trouble code may be cleared after a predetermined period of time. This may not necessarily lead to the spark control module 226 fully relying on the knock control system once again. However, if the trouble codes remain clear, the system may have resumed functioning correctly. Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A knock diagnostic module, comprising:
    a digital signal processor (DSP) that performs N Fast Fourier Transforms (FFTs) during a knock window around a firing event of a first cylinder based on output from a vibration sensor measured during N different periods during the knock window to produce N sets of FFT points, respectively, wherein N is an integer greater than or equal to 2;
    a data reduction module that:
        selects one of the N sets of FFT points;
        selects one of M ranges of interest within the selected one of the N sets of FFT points, wherein M is an integer greater than or equal to 1; and
        determines a single intensity value based on ones of FFT points within the selected one of the M ranges of interest in the selected one of the N sets of FFT points;
    a processing module that determines whether knock occurred based on the single intensity value and an average intensity value determined for the first cylinder;
    a knock module that increments a sample count for the first cylinder in response to the firing event of the first cylinder and selectively increments a knock count for the first cylinder based on whether knock occurred;
    a knock analysis module that analyzes the knock count of the first cylinder when the sample count of the first cylinder reaches a predetermined value and selectively generates an excessive knock signal when the knock count exceeds a predetermined threshold;
    a low variation module that determines a variation for the first cylinder based on a difference between the intensity value and a second intensity value determined for a previous firing event of the first cylinder;
    a low variation analysis module that selectively generates a low variation signal for the first cylinder when an average of the variation and at least one other variation of the first cylinder is less than a predetermined value and that determines the predetermined value based on an engine speed and an engine load;
    an abnormal range module that selectively generates an abnormal range signal when the intensity value is outside of a predetermined range and that determines the predetermined range based on the engine speed and the engine load; and
    a remedial action module that selectively performs a remedial action based on the excessive knock signal, the abnormal range signal, and the low variation signal.

2. The knock diagnostic module of claim 1 wherein the remedial action prevents a spark control module from advancing spark timing beyond a predetermined threshold.

3. The knock diagnostic module of claim 2 wherein the remedial action further includes generating a trouble code.

4. The knock diagnostic module of claim 1 further comprising a counter module that stores the sample count and the knock count of the first cylinder.

5. The knock diagnostic system of claim 1 wherein the data reduction module determines the M ranges of interest based on an engine speed.

6. The knock diagnostic system of clam 1 wherein the data reduction module sets the single intensity value to a maximum one of the FFT points within the selected one of the M ranges of interest in the selected one of the N sets of FFT points.

7. The knock diagnostic system of claim 1 wherein the data reduction module sets the single intensity value to an average of the FFT points within the selected one of the M ranges of interest in the selected one of the N sets of FFT points.

8. The knock diagnostic system of claim 1 wherein the data reduction module selects the one of the M ranges of interest within the selected one of the N sets of FFT points based on an engine speed.

9. The knock diagnostic system of claim 1 wherein the data reduction module selects the one of the sets of FFT points based on an engine speed.

10. A method of knock detection, comprising:
    performing N Fast Fourier Transforms (FFTs) during a knock window around a firing event of a first cylinder based on output from a vibration sensor measured during N different periods during the knock window to produce N sets of FFT points, respectively, wherein N is an integer greater than or equal to two;

selecting one of the N sets of FFT points;
selecting one of M ranges of interest within the selected one of the N sets of FFT points, wherein M is an integer greater than or equal to 1;
determining a single intensity value based on ones of the FFT points within the selected one of the M ranges of interest in the selected one of the N sets of FFT points;
determining whether knock occurred based on the single intensity value and an average intensity value determined for the first cylinder;
incrementing a sample count in response to the firing event of the first cylinder and selectively incrementing a knock count for the first cylinder based on whether knock occurred;
analyzing the knock count of the first cylinder when the sample count of the first cylinder reaches a predetermined value and selectively generating an excessive knock signal when the knock count exceeds a predetermined threshold;
determining a variation for the first cylinder based on a difference between the intensity value and a second intensity value determined for a previous firing event of the first cylinder;
selectively generating a low variation signal for the first cylinder when an average of the variation and at least one other variation of the first cylinder is less than a predetermined value;
determining the predetermined value based on an engine speed and an engine load;
selectively generating an abnormal range signal for the first cylinder when the intensity value is outside of a predetermined range;
determining the predetermined range based on the engine speed and the engine load; and
selectively performing a remedial action based on the excessive knock signal and the low variation signal.

11. The method of claim 10 wherein the remedial action includes preventing advancement of a spark timing beyond a predetermined threshold.

12. The method of claim 11 wherein the remedial action further includes generating a trouble code.

13. The method of claim 10 further comprising:
storing the sample count and the knock count of the first cylinder.

14. The method of clam 10 further comprising setting the single intensity value to a maximum one of the FFT points within the selected one of the M ranges of interest in the selected one of the N sets of FFT points.

15. The method of claim 10 further comprising setting the single intensity value to an average of the FFT points within the selected one of the M ranges of interest in the selected one of the N sets of FFT points.

16. The method of claim 10 further comprising selecting the one of the M ranges of interest based on an engine speed.

17. The method of claim 10 further comprising selecting the one of the N sets of FFT points based on an engine speed.

18. The method of claim 10 further comprising determining the M ranges of interest based on an engine speed.

* * * * *